Nov. 19, 1940.                D. R. PASSAUER                2,221,923
                                  VISE
                            Filed Dec. 1, 1938
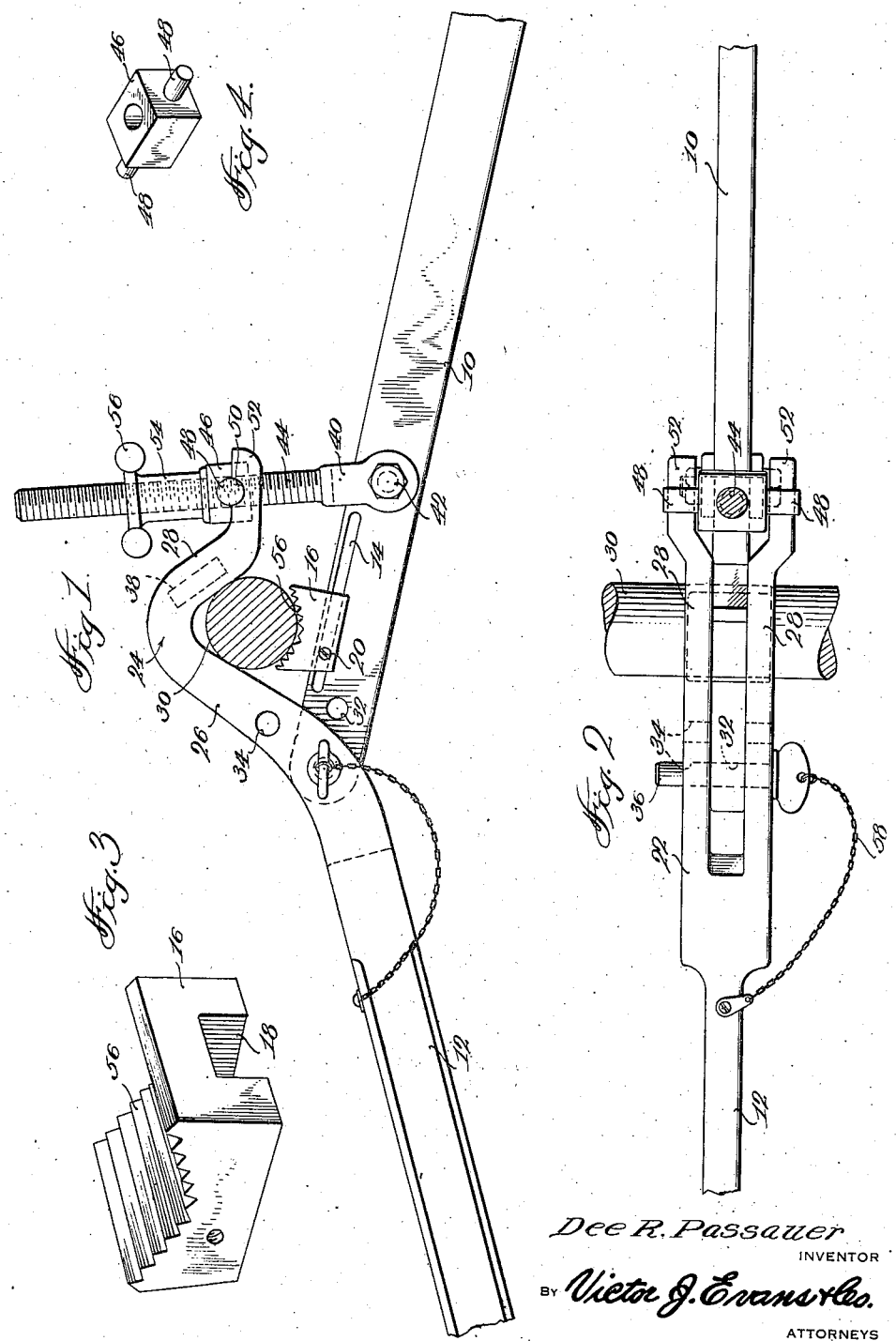
Dee R. Passauer
INVENTOR
BY Victor J. Evans & Co.
ATTORNEYS Patented Nov. 19, 1940

2,221,923

UNITED STATES PATENT OFFICE 2,221,923

VISE

Dee R. Passauer, Bradford, Pa.

Application December 1, 1938, Serial No. 243,431

2 Claims. (Cl. 81—19)

My invention relates to pipe fitters' equipment, and has among its objects and advantages the provision of an improved vise.

In the accompanying drawing:

Figure 1 is an elevational view of a vise in accordance with my invention;

Figure 2 is a top view;

Figure 3 is a perspective view of one of the jaws; and

Figure 4 is a perspective view of a portion of the jaw clamping means.

In the embodiment selected to illustrate my invention, I make use of a steel bar 10 and a steel jaw bar 12. Bar 10 is straight, and is provided with a longitudinal groove 14 in one face thereof. A jaw 16 is slidably related to the bar 10 and includes a groove 18 which slidably receives the upper edge and side margins of the bar. A set screw 20 is threaded into the jaw 16 and has its end slidably positioned inside the groove 14 for holding the jaw in assembled relation with the bar 10.

Jaw bar 12 includes two spaced runs 22 arranged in parallel relation and shaped to provide a jaw formation 24 embodying converging reaches 26 and 28 oppositely related to the jaw 16 for clamping an article, such as a pipe indicated generally at 30. Bar 10 is provided with bores 32, while the jaw bar 12 is provided with bores 34 in the runs 22. A bolt 36 is slipped through one opening 32 and one of the openings 34 for pivotally relating the bar 10 with the jaw bar 12, as illustrated in Figure 1. The holes selected will depend upon the size article to be clamped in the vise. With the parts adjusted according to Figure 1, large article 30 may be accommodated, while alignment of the other opening 32 with the other opening 34 will provide a pivotal connection for accommodating smaller work.

Near the lower ends of the reaches 28 I weld a tie bar pin 38. A yoke 40 is pivotally related to the bar 10 through the medium of a bolt 42. Yoke 40 terminates in a screw 44 upon which I slidably mount a collar 46 provided with pins 48 arranged to lie in grooves 50 in the offset ends 52 of the runs 22 when the parts are connected according to Figure 1. A sleeve 54 has threaded relation with the screw 44 and is provided with a hand wheel 56 facilitating rotation of the sleeve.

Collar 46 may be shifted manually longitudinally of the screw 44 for positioning the pins in the grooves 50, after which the jaw part 24 may be moved into clamping relation with the jaw 16 by tightening the sleeve 54 down on the collar 46. Collar 46 fits snugly between the offset ends 52 so as to restrain the collar 46 against relative rotary motion on the screw 44. Jaw 16 is provided with a toothed V-face 56 so as to effectively support round articles such as the pipe 30. At the same time, the reaches 26 and 28 are arranged in converging relation so as to take the configuration of a V inverted with respect to the V-face 56. Thus the pipe 30 will be effectively supported and balanced in the position illustrated in Figure 1.

A powerful clamping action on the pipe 30 is had through the medium of the sleeve 54 which has threaded relation with the screw 44. Thus an article such as the pipe may be effectively clamped in the vise. With the parts arranged according to Figure 1, the bar 10 and the jaw bar 12 constitute a frame structure which may be placed on the floor or other support for holding the pipe 30 above the supporting surface to facilitate cutting thereof, as an example. Pipes of different diameters may be effectively clamped in the vise. The pins 48 are easily disconnected from the offset ends 52 by merely moving the sleeve 54 upwardly on the screw 44. Yoke 40 may be disconnected from the bar 10, while the latter may be disconnected from the jaw bar 12, so that the parts may be closely compacted for transportation purposes. Thus I provide a vise which may be effectively clamped onto the work in the absence of work benches and other types of mounts such as are required for conventional vises. A chain 58 has one end connected with the bolt 36 and its other end attached to the bar 12 to prevent loss of the bolt.

Having thus described certain embodiments of my invention in detail, it is, of course, understood that I do not desire to limit the scope thereof to the exact details set forth except in so far as those details maybe defined in the appended claims.

I claim:

1. A vise of the type described comprising first and second handle-bars, said first bar being fashioned with a V-shaped jaw at one end thereof, said second bar having one end pivotally connected with the first bar adjacent said V-shaped jaw, with the V-shaped jaw extending over said second bar, a second jaw slidably connected with said second bar opposite said V-shaped jaw, with the latter opening in the direction of the second jaw, a screw having an end pivotally connected with said second bar, a pressure element engaging said V-shaped jaw, and a member threaded on said screw and engaging said pressure element for clamping said V-shaped jaw and the second jaw upon work positioned therebetween, said bars being fixedly related and diverging at an obtuse angle to provide supporting legs for the vise when said jaws are clamped on the work.

2. A vise of the type described comprising first and second handle-bars, said first bar being fashioned with a V-shaped jaw at one end thereof, said second bar having one end pivotally connected with the first bar adjacent said V-shaped jaw, with the V-shaped jaw extending over said second bar, a second jaw slidably connected with said second bar opposite said V-shaped jaw, with the latter opening in the direction of the second jaw, a screw having an end pivotally connected with said second bar, a pressure element engaging said V-shaped jaw, a member threaded on said screw and engaging said pressure element for clamping said V-shaped jaw and the second jaw upon work positioned therebetween, said bars being fixedly related and diverging at an obtuse angle to provide supporting legs for the vise when said jaws are clamped on the work, said V-shaped jaw comprising two spaced members having said one end of the second bar positioned therebetween, said members and said one end being provided with a series of openings, a pin adapted to be selectively inserted in aligned openings in said members and said one end of the second bar for pivotally connecting the two bars in different positions to change the relative positions of said V-shaped jaw and said second jaw, each of said members having a recess, and said pressure element having pins lying in said recesses.

DEE R. PASSAUER.